United States Patent [19]

Carlston et al.

[11] Patent Number: 5,194,558

[45] Date of Patent: Mar. 16, 1993

[54] DISK STACKER WITH NOVEL PADDLE WHEEL WIPER MADE OF POLYETHER URETHANE

[75] Inventors: Richard L. Carlston; Edward L. Schlueter, Jr., both of Rochester; Lucille M. Sharf, Pittsford, all of N.Y.

[73] Assignee: Xerox Corporation, Stamford, Conn.

[21] Appl. No.: 767,441

[22] Filed: Sep. 30, 1991

[51] Int. Cl.$^5$ .............................................. C08G 18/10
[52] U.S. Cl. ........................................ 528/60; 528/76; 271/187
[58] Field of Search .................... 528/60, 76; 271/187

[56] References Cited

U.S. PATENT DOCUMENTS

| | | | |
|---|---|---|---|
| 2,899,411 | 8/1959 | Schollenberger | 528/76 |
| 2,901,467 | 8/1959 | Croco | 528/76 |
| 4,451,622 | 5/1984 | DiDomenico, Jr. et al. | 525/426 |
| 4,519,698 | 5/1985 | Kohyama et al. | 355/15 |
| 4,543,405 | 9/1985 | Ambrose et al. | 528/78 |
| 4,640,504 | 2/1987 | Garavuso | 271/113 |
| 4,823,161 | 4/1989 | Yamada et al. | 355/15 |
| 4,958,197 | 9/1990 | Kinashi et al. | 355/299 |

Primary Examiner—Maurice J. Welsh
Assistant Examiner—Rachel Johnson

[57] ABSTRACT

A disk stacker for inverting and stacking sheets has a stacking tray and registration member and a paddle wheel wiper having semicircular blades made of a polyurethane elastomer obtained by the reaction of a polytetramethylene ether glycol having the formula $HO[(CH_2)_4O]_nH$ where n is from 10 to 60, preferably 55 to 60, and from about 20 to about 95 parts preferably 22 to 26 parts, by weight per 100 parts by weight of said glycol of a diisocyanate selected from the group consisting of diphenylmethane diisocyanates, toluene diisocyanates, naphthalene diisocyanates and blends thereof and a sufficient amount of cross linking agents to provide a crosslinked elastomer, said cross linking agents comprising a mixture of from about 75% to 60% by weight of a diol having the formula $HO(R_1)OH$ where $R_1$ is a straight or branched chain alkyl group having from 2 to 12 carbon atoms and from about 25% to 40% by weight of a triol having the formula: $R'-C-[(OH)_a(CH_2OH)_b]$ where R' is H, $CH_3$ or $C_2H_5$, a is 0 or 1, b is 2 or 3 and a+b=3.

28 Claims, 6 Drawing Sheets

DISK STACKER WITH NOVEL PADDLE WHEEL WIPER MADE OF POLYETHER URETHANE

CROSS REFERENCE TO RELATED APPLICATIONS

Attention is directed to the following co-pending U.S. patent applications filed concurrently herewith. U.S. patent application Ser. No. 07/767,442 entitled High Wear Resistance Low Compression Set Polyurethane in the name of Edward L. Schlueter et al., U.S. application Ser. No. 07/767,432 entitled Cleaning Apparatus in the name of Nero R. Lindblad et al., U.S. application Ser. No. 07/767,431 entitled Sheet Handling Scuffer Paddle Wheel in the name of Lucille M. Sharf et al., U.S. application Ser. No. 07/767,711 entitled Sheet Registration Device in the name of Robert N. Finsterwalder et al. Attention is also directed to copending application Ser. No. 07/568,736 entitled Disk Stacker including Wiping Member for Registration Assist filed Aug. 17, 1990 in the name of McGraw et al.

BACKGROUND OF THE INVENTION

The present invention is directed to a novel paddle wheel wiper for a disk stacker and has particular application in an electrostatographic printing apparatus.

In the process of electrophotographic printing, a photoconductive surface is charged to a substantially uniform potential. The photoconductive surface is image wise exposed to record an electrostatic latent image corresponding to the informational areas of an original document being reproduced. This records an electrostatic latent image on the photoconductive surface corresponding to the informational areas contained within the original document. Thereafter, a developer material is transported into contact with the electrostatic latent image. Toner particles are attracted from the carrier granules of the developer material onto the latent image. The resultant toner powder image is then transferred from the photoconductive surface to a sheet of support material and permanently affixed thereto.

This process is well known and useful for light lens copying from an original and printing application from electronically generated or stored originals, and in ionography.

In the above referenced copending application Ser. No. 07/568,736 a Disk Stacker is described which receives, inverts, stacks and registers sheets against a registration member and has an elongated flexible wiper which moves in timed relation to the rotatable disk engaging sheets near the output position and forcing the sheets to contact the registration member. The wiper is described and illustrated as having an elongated flexible wiping member attached at one end to the shaft about which the disk rotates and a second end having a high coefficient of friction to engage the sheet near the output station. Since the preferred rotatable disk has two diametrically opposed slots, a second wiper is attached to the shaft diametrically opposed to the first one. In practice the illustrated system used wipers with the wiping end made of a conventional polyester polyurethane. While capable of performing adequately this material suffers certain deficiencies, particularly with respect to the variation in the mechanical properties with changes in temperature and relative humidity. The mechanical properties such as resiliency, wear, compression set and tensile set are dynamic properties varying with changes in temperature and relative humidity, thereby, providing unstable paper edge registration alignment. Accordingly, there is a need for an improved paddle wheel wiper having a more stable response in mechanical properties, particularly resiliency, to variations in temperature and relative humidity and in particular, having better wear and compression set characteristics and paper edge registration alignment in electrostatographic apparatus.

PRIOR ART

U.S. Pat. No. 4,640,504 to Garavuso et al. describes a paddle wheel feeder adapted to feed sheets individually from a stack of sheets which has a paddle wheel having a plurality of individual blades adapted to strike the stack one at a time to inertially separate the top sheet in the stack from the rest of the stack where each of the blades are semi-circular in shape with respect to an axis running orthogonal to the axis of rotation of the paddle wheel. In operation the blades buckle as they contact the top sheet in the stack so as to present an increasingly wider frictional surface to the top sheet without an increase in normal force.

SUMMARY OF THE INVENTION

In accordance with a principle aspect of the present invention a disk stacker and in particular a paddle wheel wiper more stable in mechanical properties in response to variations in temperature and relative humidity is provided.

In a further aspect of the present invention the paddle wheel wiper is made of a polyurethane elastomer obtained by the reaction of a polytetramethylene ether glycol having the formula $HO[(CH_2)_4O]_nH$ wherein n is from 10 to 60, and from about 20 to about 95 parts by weight per 100 parts by weight of the glycol of a diisocyanate selected from the group of diphenylmethane diisocyanates, toluene diisocyanates, naphthalene diisocyanates and blends thereof and a sufficient amount of crosslinking agents to provide a cross linked elastomer, the crosslinking agents comprising a mixture of from about 75% to 60% weight of a diol having the formula $HO(R_1)OH$ where $R_1$ is a straight or branched chain alkyl group having 2 to 12 carbon atoms and from about 25% to 40% weight of a triol having the formula: $R'—C—[(OH)_a(CH_2OH)_b]$ where $R'$ is H, $CH_3$ or $C_2H_5$, a is 0 or 1, b is 2 or 3 and $a+b=3$.

In a further aspect of the present invention the elastomer is prepared by first forming a prepolymer of the polytetramethylene ether glycol and the diisocyanate followed by the addition of both crosslinking agents to the prepolymer.

In a further aspect of the present invention the elastomer is prepared by adding all of the recited reactive constituents including the crosslinking agents to a reaction vessel at the same time.

In a further aspect of the present invention the mixture of crosslinkers is present in an amount of from about 4 to 18 parts by weight per 100 parts by weight of the glycol and preferably from about 4 to 6 parts by weight for the higher molecular weight glycols.

In a further aspect of the present invention the crosslinker is a mixture of about 75% weight of 1,4 butanediol and 25% weight trimethylolpropane.

In a further aspect of the present invention the crosslinker is a mixture of about 60% weight, 1,4 butanediol and 40% weight trimethylolpropane.

In a further aspect of the present invention n is from 55 to 60 parts by weight and the diisocyanate is present in an amount of from about 22 to 26 parts by weight per 100 parts by weight of the glycol.

In a further aspect of the present invention the diisocyanate is selected from the group of diphenyl methane diisocyanates and in a preferred embodiment is a blend of 4,4'diphenylmethane diisocyanate and 2,4'diphenylmethane diisocyanate.

For a better understanding as well as other objects and further features thereof, reference is made to the following drawings and descriptions.

DESCRIPTION OF PREFERRED EMBODIMENT

Figures 1, 1A:
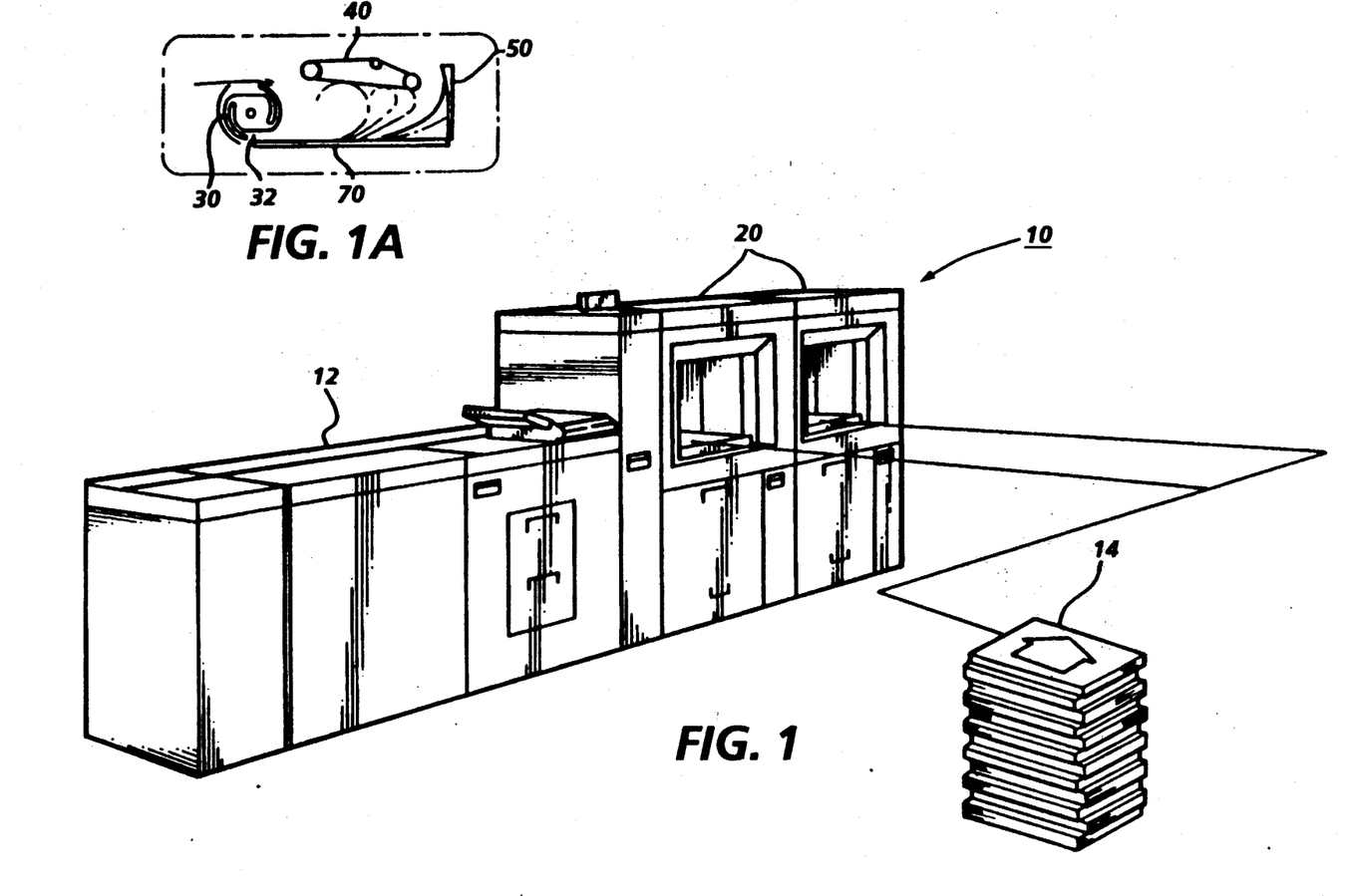
FIG. 1 is an isometric view of a document outputting device which incorporates two disk stackers with paddle wheel wipers according to the present invention.
FIG. 1A schematically illustrates some of the components of the disk stacker with paddle wheel wiper according to the present invention.

FIG. 1 illustrates a feeder/stacker 10 which includes two disk stackers 20 according to the present invention. Feeder portion 12 can be, for example, a high speed copier or printer. One type of system usable as feeder portion 12 can include an optical scanner for digitizing data contained on original documents and supplying the digitized data to a high speed, high quality printer such as a laser printer which outputs documents to the disk stackers 20. Each disk stacker 20 includes a rotating disk 30 which includes one or more slots for receiving sheets therein. Rotating disk 30 then rotates to invert the sheet and register the leading edge of the sheet against a registration means or wall 32 which strips the sheet from the rotatable disk 30. The sheet then drops to the top of the stack of inverted sheets which are supported on a vertically movable elevator 70. An overhead trail edge assist belt 40 is located adjacent the rotatable disk 30 and above elevator platform 70 to assist in the inversion of sheets. Elevator platform 70 is moved in a vertical direction by the actuation of a screw drive mechanism (not shown). A stack height sensor is used to control the movement of platform 70 so that the top of the stack remains at substantially the same level. An oscillating trail edge guide 50 is provided to improve the registration of the documents in the stack against registration wall 32. The provision of more than one disk stacker 20 enables sheets to be outputted at higher speeds and in a continuous fashion.

Figure 2A:
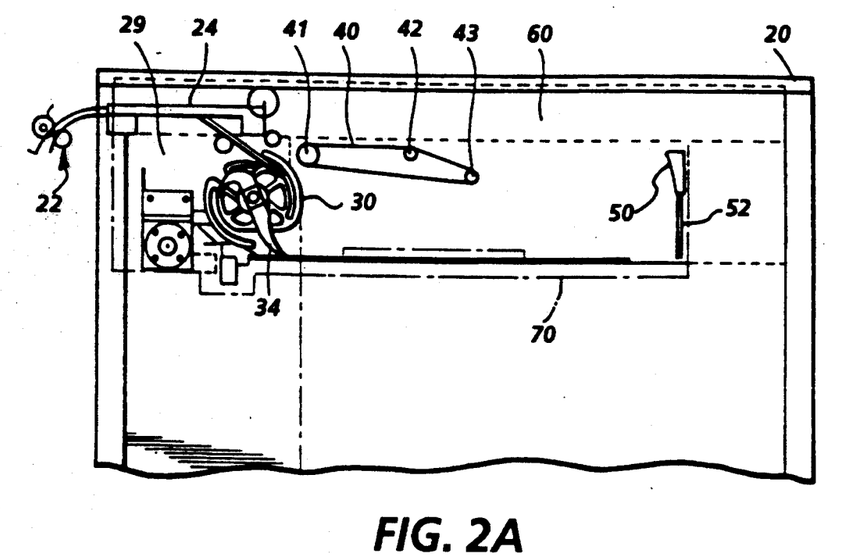
FIGS. 2A and 2B are schematic side views of a disk stacker according to one embodiment of the present invention.
Figure 2B:
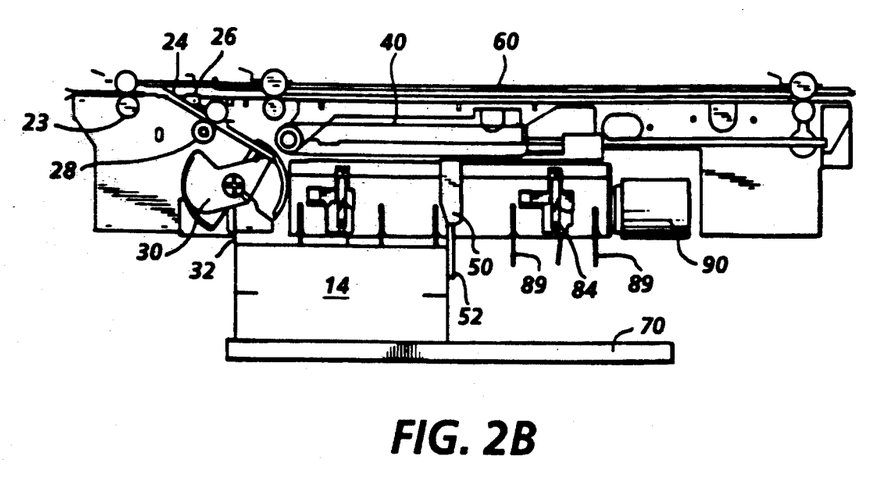
Figure 3:
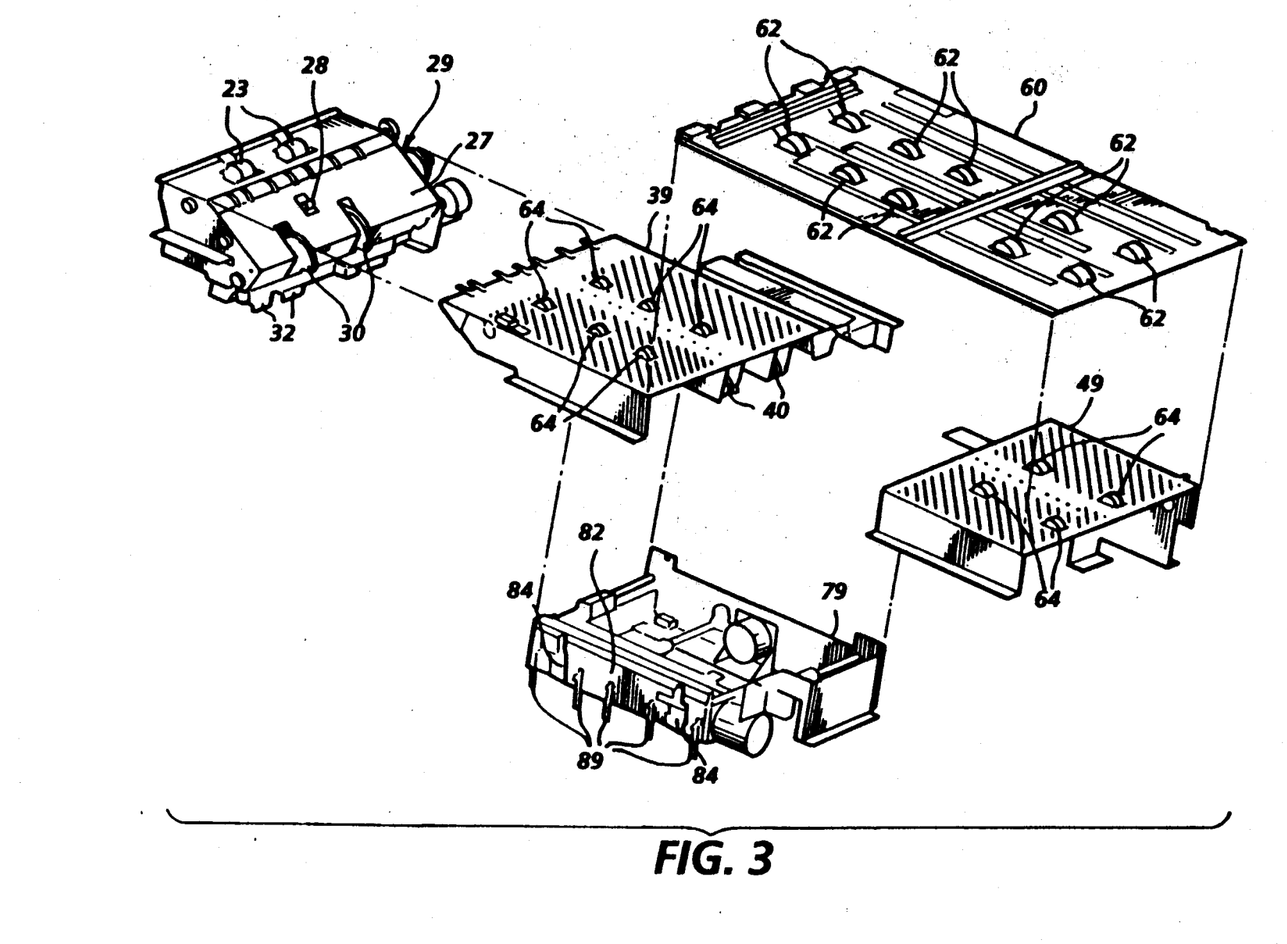
FIG. 3 is an exploded, isometric view of the disk stacker of FIGS. 2A and 2B.
Figure 4:
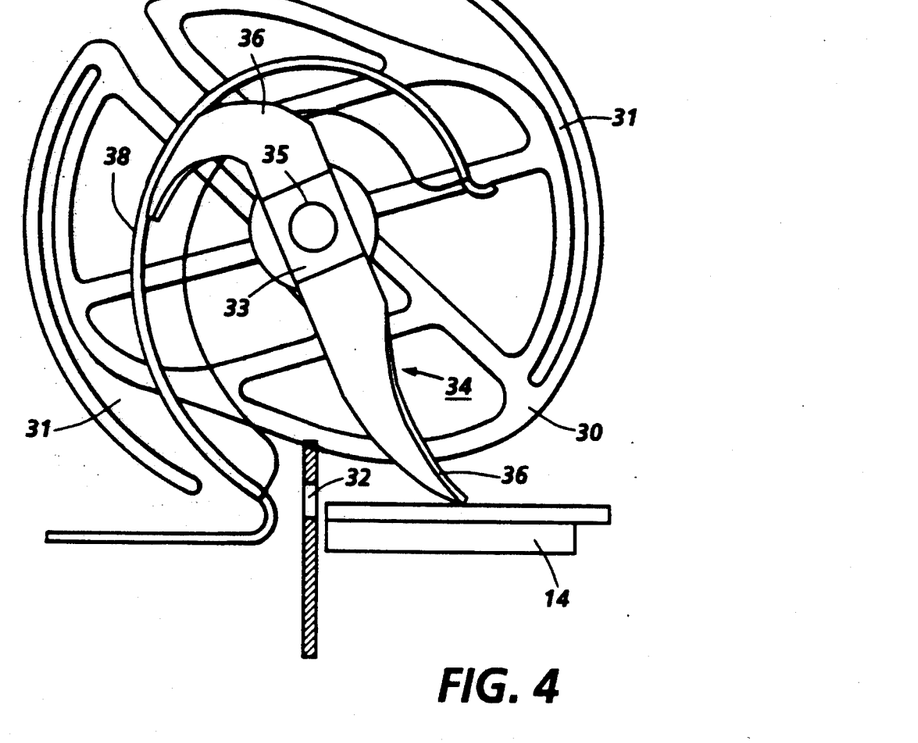
FIG. 4 is a side view of a rotatable disk which incorporates a paddle wheel wiping member for contacting and forcing the top sheet in the stack against the registration wall of the disk stacker.

FIGS. 2A, 2B and 3 illustrate the basic components of the disk stacker. Disk stacker 20 includes a disk assembly 29 which includes the rotatable disk 30 therein. Disk stacker 20 also includes bypass transport idler assembly 60 which includes a plurality of pairs of bypass idler rollers 62 which engage bypass driver rollers to drive sheets over the sheet stacking area and to a device, such as another disk stacker or a document finishing apparatus located downstream relative to the process direction of disk stacker 20. Disk stacker 20 also includes a trail edge transport and forward bypass transport assembly 39 which includes a plurality of pairs of bypass drive rollers 64 in an upper surface thereof which engage some of the pairs of bypass idler rollers 62 to define a plurality of nips therebetween for driving sheets therethrough. A lower portion of trail edge transport and forward bypass transport assembly 39 includes one or more trail edge transport belts 49. A trail edge guide and secondary bypass transport assembly 49 includes two pairs of bypass drive rollers 64 on an upper surface thereof which engage two of the pairs of bypass idler rollers 62 to define a plurality of nips therebetween for driving sheets therethrough. A lower portion of trail edge guide and secondary bypass transport assembly 49 includes the trail edge guide 50. Trail edge guide 50 includes an oscillating member 52 which functions to register sheets on the stack 14 against front registration wall 32. Trail edge guide 50 is movably mounted to trail edge guide and secondary bypass transport assembly 49 so that sheets having different lengths can be accommodated in the disk stacker 20, FIG. 2A illustrates the position of trail edge guide 50 where large sheets such as 11"×17" sheets are fed to stacking device 20, while FIG. 2B illustrates the position of trail edge guide 50 for smaller sheets such as 8½"×11" sheets. Trail edge guide 50 includes an oscillation generator which causes oscillating member or plate 52 to oscillate in a direction parallel to the sheet process direction so that front edges of the uppermost sheets in the stack are tamped against front registration wall 32. Plate 52 is mounted to trail edge guide 50 so that it can shift slightly in the vertical direction and also includes one or more fingers which extend downward from a lower surface thereof to enter grooves formed in the upper surface of elevator platform 70. Such an arrangement of elements ensures that oscillating member 52 will engage even the first sheet placed on elevator platform 70.

Two tamping mechanisms 79 (one of which is illustrated in FIG. 3) are also provided for tamping the sides of the sheets on stack 14 against a side registration wall in a manner to be described below. Each tamping mechanism 79 includes a side registration wall (such as side registration wall 82 in FIGS. 2A and 3) and at least one tamper (such as tamper 84 in FIGS. 2A and 3). Each side registration wall includes a plurality of fingers 89 which extend downwardly therefrom. These fingers 89 are spring biased so that they will contact and be moved upward (against the spring bias) by elevator platform 70 when elevator platform 70 is in its uppermost position. The surface of each finger 89 which contacts the sheet stack 14 is flush with its corresponding side registration wall and thus forms an extension of its side registration wall. This arrangement ensures that there will be a good corner between each side registration wall and elevator platform 79 when platform 70 is in its uppermost position.

Platform 70 can be provided with a recess for receiving each finger 89 so that the lowest portion of each finger 89 will be located below the upper surface of elevator platform 70. The recess prevents the first few sheets which are placed on platform 70 from being pinched between the lowest portion of each finger 89 and the upper surface of platform 70. It is also possible to extend each side registration wall downward and provide an aperture in platform 70 through which the lower end of each side registration wall extends when platform 70 is in its uppermost position. However, since the side registration walls of the present invention are movable in a direction transverse to the sheet process direction to adjust for different sheet sizes, a plurality of holes or one large hole would be required in elevator platform 70 for each side registration wall to receive the lower end of each side registration wall at the plurality of positions at which it may be located. These holes tend to reduce the strength and durability of the elevator platform. With a plurality of fingers 89 which are received in recesses formed in elevator platform 70, no holes are required in elevator platform 70. Instead, an elongated recess is formed in the upper surface of platform 70 for each finger 89. Each recess extends across at least a portion of platform 70 in a direction transverse to the sheet process direction to receive its corresponding finger regardless of the location of its side registration wall. The recesses in platform 70 actually function to strengthen platform 70 by providing reinforcement therefor.

Before entering disk stacker 20, the sheets exit through output rollers 22 of an upstream device such as a printer, copier, or other disk stacker. Sheets may need to be rotated so that they have a certain orientation after being inverted by disk 30. The sheets can enter disk stacker 20 long edge first or short edge first. After entering stacker 20, the sheet enters predisk transport 24 where the sheet is engaged by the nip formed between one or more pairs of disk stacker input rollers 23. If a bypass signal is provided, bypass deflector gate 26 moves downward to deflect the sheet into bypass transport assembly 60. If no bypass signal is provided, the sheet is directed to disk input rollers 28 which constitute part of the feeding means for feeding sheets to an input position (shown in FIGS. 2A and 2B) of disk 30.

The movement of disk 30 can be controlled by a variety of means conventional in the art. Preferably, a sensor located upstream of disk 30 detects the presence of a sheet approaching disk 30. Since disk input roller 28 operates at a constant first velocity, the time required for the lead edge of the sheet to reach the disk slot 31 is known. As the lead edge of the sheet begins to enter the slot, the disk rotates through a 180° cycle. The disk 30 is rotated at a peripheral velocity which is about ½ the velocity of input roller 28 so that the leading edge of the sheet progressively enters the disk slot. However, the disk is rotated at an appropriate speed so that the leading edge of the sheet contacts registration wall 32 prior to contacting the end of the slot. This reduces the possibility of damage to the lead edge of the sheet. Such a manner of control is disclosed in above-incorporated U.S. Pat. No. 4,431,177 to Beery et al.

One advantageous feature of the present invention involves the construction and operation of trail edge transport belt 40. As opposed to previous systems which utilized a trail edge transport belt which operates at the same velocity as the feeding means which input sheets into the rotatable disk, the present invention includes a trail edge assist belt 40 which is rotated at a velocity which is greater than the velocity at which feeding means (which includes feed roller 23 and 28) is operated. Preferably, transport belt 40 is rotated at a velocity which is 1.5 times the velocity of the feeding means. Additionally, trail edge transport belt 40 is arranged at an angle to elevator platform 70 so that a distance between the transport belt and elevator platform 70 decreases as the transport belt 40 extends away from rotatable disk 30. Three pulleys 41, 42 and 43, at least one of which is driven by a motor (not shown) maintain tension on transport belt 40 and cause transport belt 40 to rotate at a velocity which is greater than that of the feeding means. The transport belt 40 is arranged at an angle in the range between 5° and 30° to the planar surface of elevator 70. Thus, when elevator platform 70 is a horizontally arranged tray, a plane defined by the portion of transport belt 40 which contacts the trailing portion of the sheet slopes downwardly as it extends away from rotatable disk 30. The velocity and arrangement of trail edge assist transport 40 prevents long, light weight sheets from collapsing before they are entirely inverted and also prevents heavier weight sheets from stubbing on the overhead bypass mechanism 60 and other overhead components of disk stacker 20. In particular, it has been found that operating trail edge transport belt 40 at a higher speed than the feeding rollers 28 and at an angle to elevator platform 70 prevents long, light weight sheets from collapsing on themselves prior to being entirely inverted. Increasing the speed of transport belt 40 increases the energy which is imparted to the trail edge of the sheet to help keep the sheet in contact with belt 40 until the entire sheet is inverted. Increasing the speed of transport belt 40 increases the energy which is imparted to the trail edge of the sheet to help keep the sheet in contact with belt 40 until the entire sheet is inverted. By angling belts 40 so that they are closer to platform 70 as they extend from disk 30, contact between the belts and sheets are also improved because the belt 40 follows the path which the sheet desires to follow (i.e., the angle of belt 40 compensates for sheet drooping).

FIG. 10 is a side view of a paddle wheel wiper of the present invention in a disk stacker. This wiper is particularly useful when sheets are being fed at high speeds. Sheets fed at high speeds tend to bounce away from registration wall 32 so that the front edge of the stack is uneven. Even though trail edge guide 50 is oscillating against the rear edge of each sheet, it has been found that the front edge of the stack is still not satisfactorily even. The wiper is used to force each sheet against front registration wall 32 after being released by the disk 30 and re-register sheets which have bounced away from front registration wall 32. The paddle wheel wiper moves in timed relation to rotatable disk 30 by being attached directly to the shaft 25 which rotates disk 30. The wiper 34 has a length so that each end thereof is capable of extending radially outward from the shaft beyond the slot of the disk and, in the preferred embodiment, beyond the diameter of disk 30 so as to contact the uppermost sheet of the stack. Preferably, the wiper is long enough to contact the upper sheet on the stack for as long a time as possible prior to the next sheet being registered against registration wall 32. The wiper blade 36 must exit the output area before the next sheet arrives so as not to interfere with the stripping of the next sheet from the disk slot by registration wall 32.

The location of wiper blades is controlled by a constraining means which, in the preferred embodiment is a retaining wall 38 which is spaced from and extends partially around shaft 35 along a plane perpendicular to an axis of shaft 35. The paddle wheel wiper 34 is located in the same plane as retaining wall 38 so that it is constrained within a diameter of disk 30 for a portion of its rotation to prevent it from interfering with the inputting of sheets into the disk slot 31. Retaining wall 38 also functions to wind-up the wiper blade 36 so that when released from retaining wall 38, the energy stored in wiper blade 36 is transferred to the sheet resulting in forces being generated to ensure that the sheet is stacked and maintained in its desired position on the stack 14. The exact amount of contact as well as the timing of contact between wiper blade 36 and the top sheet on the stack can be controlled by varying the length, thickness or shape of the wiper blade 36 and/or the shape of retaining wall 38. While the wiper blade 36 must exit the output area prior to the arrival of a subsequent sheet thereto, the retaining wall 38 can be shaped so that it releases the wiper blade at a variety of positions. For example, wiper blade 38 can be released from retaining wall 50 so that contacts a sheet while the sheet is at least partially in the disk slot before or after registration means 32 begins stripping the sheet from the slot. Additionally, retaining wall 50 can be shaped so that it does not release the wiper blade until after the sheet has been entirely stripped from the slot of disk 30 by registration means 32.

The paddle wheel wiper comprises a rotatable hub 33 to which a plurality of radially extending flexible elastomeric blades or paddles 36 are either fixed by conventional means or molded thereto. The paddle wheel is mounted on disk drive shaft 35. The blades are semi-circular in shape (see FIG. 5) and as the hub rotates, the blades buckle upon contact with the stack of sheets rather than bending, creating a larger contact footprint (see FIGS. 6 and 7) with lower contact pressure for the same normal force than conventional paddle wheel blades thereby allowing increased friction and a reduced wear rate. Furthermore, since the force of buckling is a function of blade cross-section as opposed to blade length, the normal force is far less sensitive to deflection in every region of the blades except near hub 33 where stiffening takes place. Also, the buckling of the blades provides vibration damping with a resultant reduction in second sheet creep and noise production.

Figure 5:
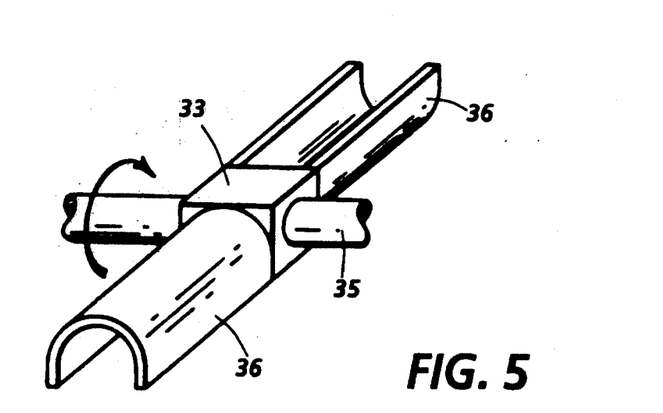
FIG. 5 is an enlarged partial isometric view of the paddle wheel wiper used in the instant invention.

The semi-circular blades 36 of the paddle wheel wiper mechanism 34, shown in detail in FIG. 5 also presents a larger contact footprint to the top of sheet stack with lower contact pressure for the same normal force thereby increasing friction and reducing wear. In addition, the curved design of the paddle wheel blades reduces blade slap and thereby reducing vibration of the blades which is a major cause of second sheet creep and noise production.

Figure 6:
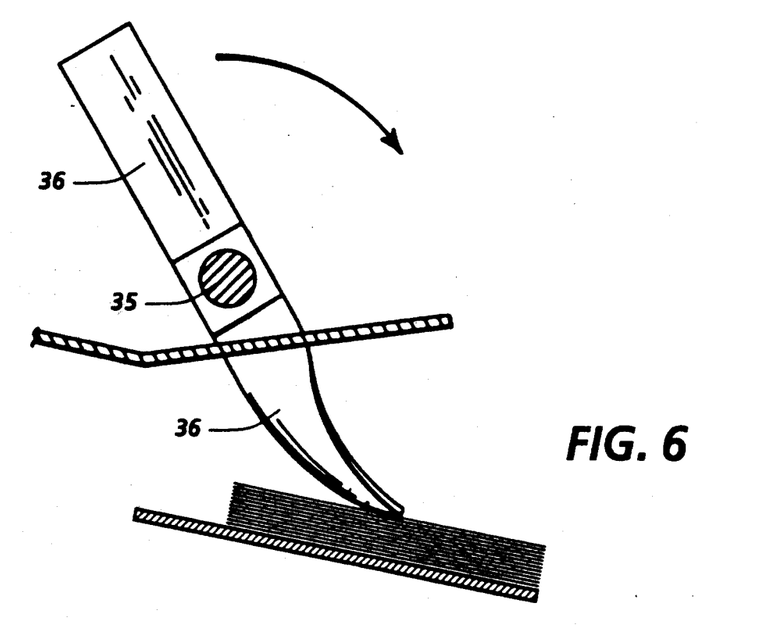
FIG. 6 is an enlarged partial side view of the paddle wheel wiper of the instant invention.
Figure 7:
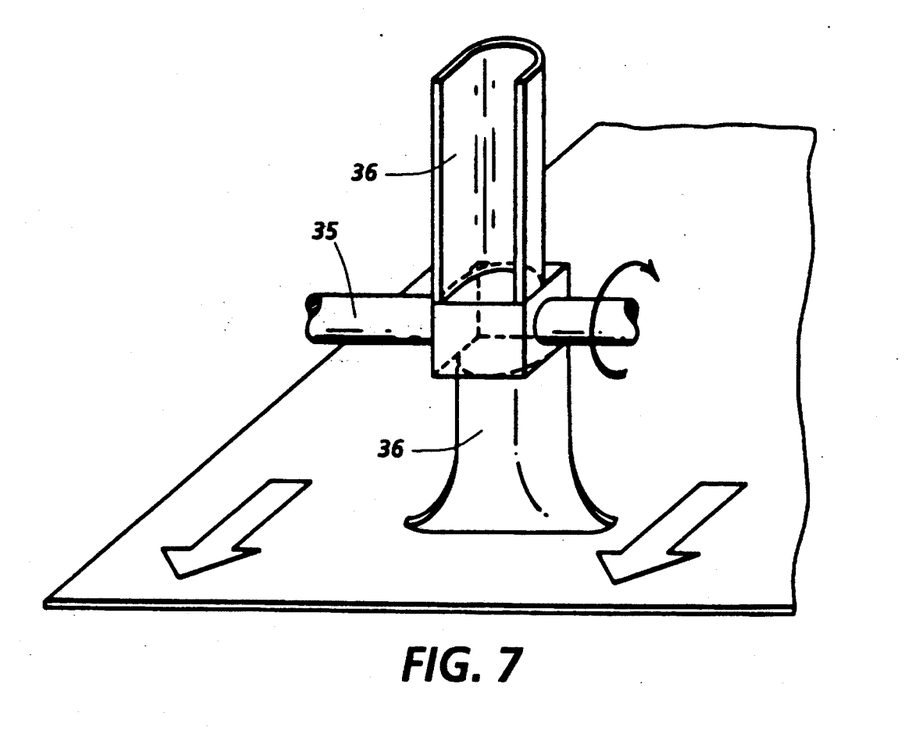
FIG. 7 is a partial schematic of the present invention showing the buckling of a blade against a sheet.
Figure 8:
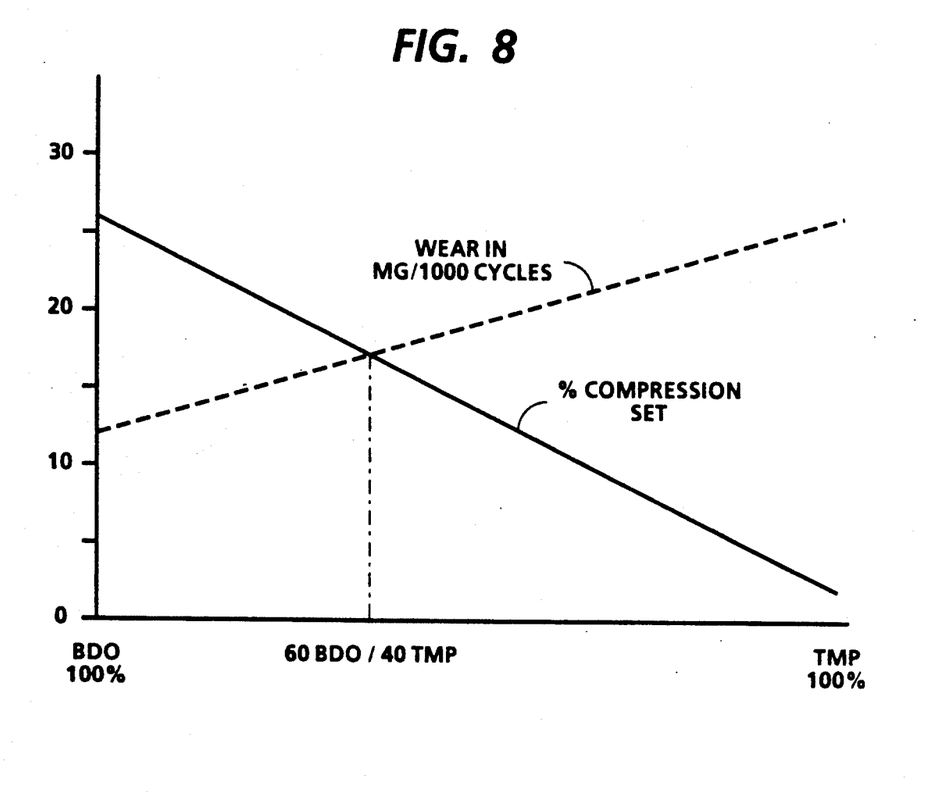
FIG. 8 is a graphical representation illustrating the optimization in compression set characteristics and wearing characteristics based on the selection and amount of crosslinking composition.

Rotation of paddle wheel hub 35 as shown in FIG. 6 causes blades 36 to strike sheet stack with enough force to buckle blades 36 against the top sheet in the stack. The buckling action causes the semi-circular blades to present an increasing area of blade surface against the sheet as the blades are continued in rotation after initially contacting the stack. This increase in blade area against the top sheet in the stack, as shown more specifically in FIG. 7, presents an increasingly wide frictional surface to the top of the sheet stack without an expected concomitant increase in normal force. As a result, increased reliability is obtained as well as blade wear longevity since the buckling allows the use of less normal pressure than would be required for feeding with straight blades.

According to the present invention a disk stacker with a novel paddle wheel wiper is provided which has improved mechanical properties and in particular has improved high wear resistance and low compression set and does not cause paper edge registration alignment problems. This is achieved by carefully selecting a new polyurethane elastomer and the reactive constituents used to fabricate the elastomer and particularly the type and amount of crosslinking agents used.

Polyurethane elastomers are typically produced by the reaction of a polyisocyanate and a polyether containing hydroxyl groups according to the general reaction:

$$R_aNCO + R_bOH \rightarrow R_aNHCOOR_b$$

In the practice of the present invention the polyurethane elastomer is made by the reaction of a polytetramethylene ether glycol forming the base polymer chain which has the formula $HO[(CH_2)_4O]_nH$ wherein n is from about 10 to about 60 providing a molecular weight range of the order of from 650 to 2,900. In a preferred embodiment, wherein the overall mechanical properties including resiliency, hardness, compression set as well as toughness are relatively stable over a range of temperature and relative humidity distributions normally encountered in an office environment, n is between 55 and 60. Within this higher range of molecular weights of the glycol a relatively soft segment is provided in the polyurethane elastomer enabling a high level of resiliency over a relatively broad temperature range. The preferred polytetramethylene ether glycols are those having molecular weights near the higher end of the stated range and in particular the polyether glycol Terathane TM 2900 available from E.I. DuPont de Nemours, Inc. which has a molecular weight of about 2900.

The diisocyanate is selected from the group consisting of diphenylmethane diisocyanates, toluene diisocyanates, naphthalene diisocyanates and blends thereof and is used in amounts of from about 20 to about 95 parts by weight per 100 parts by weight of the glycol. The functional NCO groups of the diisocyanate provide a relatively hard and rigid segment in the final polymer chain and act very much like a filler to provide a tough but flexible structure that has both hard and soft domains. Typical diisocyanates useful in the practice of the present invention include 4,4'diphenylmethane diisocyanate, 2,4'diphenylmethane diisocyanate, 2,2'diphenylmethane diisocyanate, 2,4-toluene diisocyanate, 2,6-toluene diisocyanate and naphthalene 1,5-diisocyanate as well as blends and mixtures thereof. A particularly preferred blend of diisocyanates is one containing 98 percent 4,4'diphenylmethane diisocyanate and 2 percent 2,4'diphenylmethane diisocyanate available under the designation Isocyanate TM 125M from Dow Chemical Company, Midland, Mich.

In a preferred embodiment, with the preferred higher molecular weight glycols, the diisocyanate or blend thereof is present in an amount of from about 22 to 26 parts by weight per 100 parts by weight of the glycol to provide the stoichisometric amount for the reaction to go to completion.

The optimization of the mechanical properties, and in particular, the achievement of high wear resistance with low compression set is attained according to the practice of the present invention by the selection of the polyurethane elastomer and in particular by the selection of the type and amount of crosslinking agents. Both bifunctional and trifunctional crosslinking agents are used in the practice of the present invention in a weight ratio of from about 60% to 40%, to 75% to 25% of bifunctional to trifunctional agents. The bifunctional agents have been found to provide a higher toughness, provide more chain extension in that they tend to linearly link the chain thereby providing a long, generally flexible glycol chain interrupted by the rigid isocyanate units. The trifunctional crosslinkers tend to provide two ends of functionality as well as a 90 degree oriented functional member which crosslinks to other chains prohibiting the chains to slide by each other and thereby minimizing the compression set and tensile set properties. Accordingly, the appropriate bounds between hard and soft sites in the polyurethane elastomer is obtained by selecting the bifunctional and trifunctional crosslinking agents in the appropriate ratio. Typically, the bifunctional crosslinking agents take the formula $HO(R_1)OH$ where $R_1$ is a straight or branched chain alkyl group having from 2 to 12 carbon atoms and the trifunctional crosslinking agent is taken from the formula: $R'-C-[(OH)_a(CH_2OH)_b]$ where $R'$ is H, $CH_3$ or $C_2H_5$, a is 0 or 1, b is 2 or 3 and $a+b=3$. Typical bifunctional diols include ethylene glycol, 1,4 butanediol, 1,3 butanediol 1,6 hexanediol and neopentyl glycol and typical trifunctional triols include trimethylolpropane, trimethylolethane and glycerol. Particularly, preferred bifunctional crosslinking agents include 1,4 butanediol, 1,6 hexanediol and 1,3 butanediol because they extend the polymer chain linearly yielding tough wear resistant materials and particularly preferred trifunctional crosslinking agents include trimethylolpropane and trimethylolethane because they cross link the polymer chains at 90° and yield very set resistant networks. The bifunctional butanediol acts as a chain extender to extend the chain in the linear way to provide linear soft sites thereby providing the greatest toughness in the final elastomer. On the other hand, the trifunctional trimethylolpropane provides the best compression set performance because it is trifunctional and provides crosslink exchange sites to tighten up the network, thereby providing a crosslinked, three-dimensional network. An amount of combined crosslinking agents is used to provide a satisfactorily cross linked elastomer. Typically, the total amount of combined crosslinking agents is from about 4 to about 18 parts per 100 parts of the polytetramethylene ether glycol depending on the molecular weight of the glycol with more cross linking agents being used with lower molecular weight glycols. In the preferred embodiment with glycols having high molecular weight of the order of the order 2900 and smaller amounts of the diisocyanate of the order of about 22 to 26 parts by weight per 100 parts of the glycol only about 4 to 6 parts by weight of crosslinking agents is necessary because of the long glycol chain length with limited number of functional groups.

A catalyst is typically used to speed up the rate of reaction of the crosslinking and extending mechanisms to provide the cured urethane elastomers. Typical conventional catalysts performing this functioning include tin derivatives such as dibutyltindilaurate and stannous octoate; mercury derivatives such as phenylmercuric acetate and phenylmercuric acetate and tertiary amines such as Polycat 33, Polycat 41, Polycat 70 and Polycat 77 which are used in conventional amounts, typically, a few drops in a dilute solution (2%) of the diol.

The polyurethane elastomer, according to the present invention, may be made according to any suitable procedure. For example, all the reactive ingredients including the catalyst may be added at one time or serially to a single reactor vessel to produce the polyurethane elastomer. However, this procedure results in a not very well controlled reaction in that there are two reactions taking place simultaneously; one between the glycol and the diisocyanate and the other between the reaction product of the first reaction and the mixture of crosslinking agents. Thus, formation of a prepolymer, chain extension and cross linking all occur at the same time. Accordingly, it is preferred to prepare a prepolymer of at least a portion of the glycol with at least a portion of the diisocyanate to enable the reaction of the NCO groups of the isocyanate with the OH groups of the glycol to form a long chain so that the NCO groups can't subsequently take up water and retain it in the final polyurethane elastomer presenting an ultimate problem in that it results in unpredictable properties dependent on relative humidity. The prepolymer method provides an initial low molecular weight polymeric diisocyanate and provides better contact over the polyurethane formation reaction and eliminates the formation of monomeric diisocyanate. Once the prepolymer, which is typically a viscous liquid, has been formed the mixture of crosslinking agents may be added together with the catalyst to form the polyurethane elastomer. Alternatively, the reaction may be suspended after it's initiated by freezing the reactants at a temperature of the order at 40° below zero Fahrenheit and the reaction completed at a later date by placing the frozen reactants, for example in an appropriately heated tool to make a part. Once all the reactants have been added together and the polymerization reaction has been initiated the forming polyurethane may be shaped according to any of the conventional techniques including injection molding, spin casting, flow coating, etc.

EXAMPLES

Polyurethane elastomer test samples were prepared in a one shot process from the following formula: 100 parts by weight of a polytetramethylene ether glycol, DuPont Terathane TM 2900, 24 parts by weight of a mixture of 98 percent 4,4'diphenylmethane diisocyanate and 2 percent 2,4'diphenyl methane diisocyanate, Isocyanate TM 125M available from Dow Chemical Company, 3 parts by weight 1,4 butanediol available under the trademark DABCO DBO crosslinker from Air Products & Chemicals Inc., 2 parts by weight of trimethylolpropane available as RC Crosslinker TR from Wyrough and Loser, Inc., Trenton, N.J. and 1 to 5 drops of a catalyst mixture of 98 parts by weight of 1,4 butanediol and 2 parts by weight of dibutyltindilaurate.

All the ingredients were stored under nitrogen to prevent attack by atmospheric oxygen. Furthermore, each of the ingredients was stored in a jar with a molecular sieve at the bottom to absorb water and the jars placed in an oven to maintain the ingredients in a processable liquid form. The diisocyanate was stored at 40° C., the glycol, trimethylolpropane and catalyst mixture were stored at 70°-80° C. and the butanediol was stored at room temperature. Prior to mixing, the glycol which was in a beaker was degassed in a vacuum chamber for 20-30 minutes at 80° C. and the diisocyanate, also in a beaker, was degassed for 15 to 20 minutes at 80° C. The butanediol, trimethylolpropane and catalyst mixture were added to a third beaker and degassed for 20 to 30 minutes at 80° C. The butanediol, trimethylolpropane and catalyst mixture were then added to the glycol followed by the addition of the diisocyanate and hand mixed until clear, but for no longer than 30 seconds, after which the mixture was degassed in a vacuum chamber for 1 to 2 minutes to achieve approximately 1 millimeter of mercury vacuum and then poured into a mold and oven cured at 230° F. for 2 hours. The test samples were removed from the mold and postcured in an oven at 230° F. for 16 hours. The test samples were removed from the oven and preconditioned at room temperature for 10–16 days to achieve stability before evaluation.

Additional samples were made according to the above procedure except that the ratio of the two identified cross linking agents was varied as indicated in the following table. The samples were evaluated for wear and compression set with the following results:

| BDO/TMP ratio | Wear | Compression Set |
| --- | --- | --- |
| 100/0 | 12 | 26 |
| 60/40 | 17 | 17 |
| 50/50 | 20 | 12 |
| 0/100 | 27–30 | 2 |

Wear was measured in weight loss in milligrams per 1000 cycles according to the Taber Abrasion Wear Test under ASTM D4060 and compression set, or percent permanent thickness change when a sample is compressed a stated amount under certain conditions and the compression force removed, was measured using ASTM D395, Method B. The overall results comparing compression set and wear with respect to the different ratios of the crosslinking agents are graphically illustrated in FIG. 3. Therein, it may be observed that the optimum balance in compression set and wear is achieved at about the 60 to 40 weight ratio of bifunctional cross linking agent to trifunctional cross linking agent.

Using a manufacturing process with a prepolymer is preferred to control heat buildup, which changes reaction rate and crosslinking uncontrollably, during fabrication by the exothermic reaction between the base glycol polymer and the diisocyanate. This permits the initial addition of only a portion of the glycol to form a prepolymer and control the heat with the subsequent addition of a final portion of the glycol to form the elastomer. We have found that when using this technique of first forming a prepolymer it is desirable to change the weight ratio of bifunctional cross linker to trifunctional cross linker from 60 to 40 to 75 to 25 to maintain the optimum balance between compression set and wear.

A prepolymer of the Terathane TM 2900 and the isocyanate TM 125M was prepared as follows: 1000 parts by weight of the glycol which had previously been heated under vacuum at 90° C., for 2 hours to remove any moisture present and then cooled to 70° C. under nitrogen was added to 351 parts by weight of the diisocyanate. The heat of reaction will increase the temperature of the mixture to 84° C.±4° C. at which it will be held for 1 to 2 hours to ensure complete reaction. A polyurethane elastomer was prepared from the following formula 100 parts by weight of the above prepared prepolymer, 34.4 parts of the glycol, 3.4 parts of the 1.4 butanediol, 2.3 parts of the trimethylolpropane and 5 to 8 drops of the same catalyst mixture used in the one shot process. The prepolymer is stored at 80° C. and the remaining ingredients are stored as in the one shot process. The butanediol, trimethylolpropane and catalyst mixture were mixed as in the one shot process and prior to mixing all the ingredients were degassed as in the one shot process. The prepolymer was degassed in a vacuum chamber for 20 to 30 minutes at 80° C. The glycol, the mixture of the butanediol, trimethylolpropane and catalyst mixture were added to the prepolymer and hand mixed for about 30 seconds followed by degassing in a vacuum chamber for 1.5 to 2 minutes. Thereafter, the mixture was molded, cured, postcured and preconditioned as in the one shot process.

Additional evaluation in an environmental chamber shows the stability of the polyurethane elastomer according to the present invention with regard to changes in temperature and relative humidity. The samples evaluated were made according to the one shot procedure. Evaluation over the range of temperatures from 65° F. to 85° F. and relative humidity of 15% to 65%, conditions which are inclusive of most normal office environments provided the following results.

| Conditions | Hardness Shore A | Resiliency |
| --- | --- | --- |
| 65° F., 15% RH | 68 | 74 |
| 85° F., 65% RH | 74 | 76 |

Resiliency, the percent rebound, was measured according to ASTM D2632 and varies less than 5% and hardness varies less than 10%, it being noted that it is desirable to provide a hardness as close to 70 or slightly close as possible. The stability of resiliency is a dynamic property critical to successful functioning.

Accordingly, the present invention provides a novel disk stacker, and in particular, a paddle wheel wiper having high wear resistance and a low compression set and one in which it's mechanical properties remain relatively stable over a broad range of temperatures and relative humidities. In addition, the paddle wheel wiper does not cause paper edge registration alignment problems.

The patents and copending patent applications referred to herein are hereby specifically, totally and completely incorporated herein by reference.

While the present invention has been described with reference to specific embodiments described herein it will be apparent that many alternatives, modifications and variations may be made by those skilled in the art. Accordingly, it is intended to embrace all such alternatives and modifications as may fall within the spirit and scope of the appended claims.

We claim:

1. A paddle wheel wiper to transport sheets having a plurality of individual blades adapted to stroke the top sheet in a stack one at a time to inertially transport the sheet, each of said blades being semi-circular in shape with respect to an axis running orthogonal to the axis of rotation of said paddle wheel wiper and being made of a polyurethane elastomer obtained by the reaction of a polytetramethylene ether glycol having the formula $HO_nH$ where n is from 10 to 60, and from about 20 to about 95 parts by weight per 100 parts by weight of said glycol of a diisocyanate selected from the group consisting of diphenylmethane diisocyanates, toluene diisocyanates, naphthalene diisocyanates and blends thereof and a sufficient amount of cross linking agents to provide a crosslinked elastomer, said cross linking agents comprising a mixture of from about 75 to 60% weight of a diol having the formula HO($R_1$) OH where $R_1$ is a straight or branched chain alkyl group having from 2 to 12 carbon atoms and from about 25 to 40% of a triol having the formula: $R'$-C-[(OH)$_a$(CH$_2$OH)$_b$] where $R'$ is H, CH$_3$ or C$_2$H$_5$, a is 0 or 1, b is 2 or 3 and a+b=3.

2. The paddle wheel wiper of claim 1 wherein the elastomer is prepared by adding all the recited reactive constituents and cross linking agents to a reaction vessel at the same time.

3. The paddle wheel wiper of claim 1 wherein the elastomer is prepared by first forming a prepolymer of the polytetramethylene ether glycol and the diisocyanate followed by the addition of both cross linking agents to the prepolymer.

4. The paddle wheel wiper of claim 1 wherein the total weight of cross linking agents is from about 4 to about 18 parts per 100 parts of polytetramethylene ether glycol.

5. The paddle wheel wiper of claim 1 wherein the elastomer is formed from a mixture of cross linking agents of about 75% by weight of 1,4 butanediol and 25% by weight trimethylolpropane.

6. The paddle wheel wiper of claim 1 wherein the elastomer is formed from a mixture of cross linking agents of from about 60% by weight 1,4 butanediol and 40% by weight trimethylolpropane.

7. The paddle wheel wiper of claim 1 wherein n is from 55 to 60.

8. The paddle wheel wiper of claim 1 wherein said diisocyanate is present in an amount from about 22 to 26 parts by weight per 100 parts by weight of said glycol.

9. The paddle wheel wiper of claim 7 wherein said diisocyanate is present in an amount from about 22 to 26 parts by weight per 100 parts by weight of said glycol.

10. The paddle wheel wiper of claim 9 wherein the total weight of cross linking agents is from about 4 to about 6 per 100 parts by weight of polytetramethylene glycol.

11. The paddle wheel wiper of claim 1 wherein said diisocyanate is selected from the group of diphenylmethane diisocyanates.

12. The paddle wheel wiper of claim 11 wherein said diisocyanate is a blend of 4,4'-diphenylmethane diisocyanate and 2,4'-diphenylmethane diisocyanate.

13. The paddle wheel wiper of claim 2 wherein the total weight of cross linking agents is from about 4 to about 18 per 100 parts of polytetramethylene ether glycol.

14. The paddle wheel wiper of claim 2 wherein the elastomer is formed from a mixture of cross linking agents of from about 60% by weight 1,4 butanediol and 40% parts by weight trimethylolpropane.

15. The paddle wheel wiper of claim 3 wherein the total weight of cross linking agents is from about 4 to about 18 per 100 parts of polytetramethylene ether glycol.

16. The paddle wheel wiper of claim 3 wherein the elastomer is formed from a mixture of cross linking agents of about 75% by weight of 1,4 butanediol and 25% by weight trimethylolpropane.

17. The paddle wheel wiper of claim 2 wherein n is from 50 to 55, the cross linking agents are a mixture of from about 60% by weight 1,4 butanediol and 40% by weight dimethylolpropane and said diisocyanate is a blend of 4,4'diphenylmethane diisocyanate and 2,4'-diphenylmethane diisocyanate.

18. The paddle wheel wiper of claim 3 wherein n is from 50 to 55, the cross linking agents are a mixture of from about 75% by weight 1,4 butanediol and 25% by weight trimethylolpropane and said diisocyanate is a blend of 4,4'diphenylmethane diisocyanate and 2,4'-diphenylmethane diisocyanate.

19. The paddle wheel wiper of claim 1 wherein it is a single piece integrally molded article.

20. A disk stacker for receiving, inverting and stacking sheets comprising a rotatable disk with at least one sheet receiving slot, means for rotating said disk from a sheet receiving position to a sheet output position, registration means adjacent to said output position to strip a sheet from said slot and wiper means for engaging a sheet near said output position and registering it against said registration means, said wiper means comprising a polyurethane elastomer obtained by the reaction of a polytetramethylene ether glycol having the formula HO$_n$H where n is from 10 to 60, and from about 20 to about 95 parts by weight per 100 parts by weight of said glycol of a diisocyanate selected from the group consisting of diphenylmethane diisocyanates, toluene diisocyanates, naphthalene diisocyanates and blends thereof and a sufficient amount of cross linking agents to provide a crosslinked elastomer, said cross linking agents comprising a mixture of from about 75 to 60% weight of a diol having the formula HO($R_1$) OH where $R_1$ is a straight or branched chain alkyl group having from 2 to 12 carbon atoms and from about 25 to 40% of a triol having the formula: $R'$—C—[(OH)$_a$ (CH$_2$OH)$_b$] where $R'$ is H, CH$_3$ or C$_2$H$_5$, a is 0 or 1, b is 2 or 3 and a+b=3.

21. The disk stacker of claim 20 wherein the total weight of cross linking agents is from about 4 to about 18 parts per 100 parts of polytetramethylene ether glycol.

22. The disk stacker of claim 20 wherein the elastomer is formed from a mixture of cross linking agents of from about 60% by weight 14 butanediol and 40% by weight trimethylolpropane.

23. The disk stacker of claim 20 wherein n is from 55 to 60.

24. The disk stacker of claim 23 wherein said diisocyanate is present in an amount from about 22 to 26 parts by weight per 100 parts by weight of said glycol.

25. The disk stacker of claim 24 wherein the total weight of cross linking agents is from about 4 to about 6 per 100 parts by weight of polytetramethylene glycol.

26. The disk stacker of claim 20 wherein said diisocyanate is selected from the group of diphenylmethane diisocyanates.

27. The disk stacker of claim 26 wherein said diisocyanate is a blend of 4,4'-diphenylmethane diisocyanate and 2,4'-diphenylmethane diisocyanate.

28. The disk stacker of claim 20 wherein n is from 50 to 55, the cross linking agents are a mixture of from about 60% by weight 1,4 butanediol and 40% by weight dimethylolpropane and said diisocyanate is a blend of 4,4'diphenylmethane diisocyanate and 2,4'diphenylmethane diisocyanate.

* * * * *